United States Patent [19]

Porte

[11] Patent Number: 5,782,077

[45] Date of Patent: Jul. 21, 1998

[54] DEVICE FOR BLEEDING OFF AND COOLING HOT AIR IN AN AIRCRAFT ENGINE

[75] Inventor: Alain Porte, Colomiers, France

[73] Assignee: Aerospatiale Societe Nationale Industrielle, Paris, France

[21] Appl. No.: 647,060

[22] Filed: May 9, 1996

[30] Foreign Application Priority Data

May 15, 1995 [FR] France ................................. 95 05704

[51] Int. Cl.⁶ .................................. F02C 7/26; F02C 7/12
[52] U.S. Cl. ..................... 60/39.07; 60/226.1; 60/39.83; 415/178; 165/154
[58] Field of Search ....................... 60/39.07, 39.83, 60/226.1; 244/58; 415/178; 165/154

[56] References Cited

U.S. PATENT DOCUMENTS

| | | | |
|---|---|---|---|
| 2,871,671 | 2/1959 | Bartlett, Jr. et al. | 60/39.07 |
| 3,452,542 | 7/1969 | Saferstein et al. | 415/178 |
| 3,475,906 | 11/1969 | Madelung | 60/39.07 |
| 3,735,593 | 5/1973 | Howell | 60/226.1 |
| 3,777,489 | 12/1973 | Johnson et al. | 60/39.07 |
| 4,254,618 | 3/1981 | Elovic | 60/226.1 |
| 4,285,466 | 8/1981 | Linscheid et al. | 236/13 |
| 4,711,084 | 12/1987 | Brockett | 60/39.07 |
| 4,773,212 | 9/1988 | Griffin et al. | 60/39.83 |
| 5,123,242 | 6/1992 | Miller | 60/226.1 |
| 5,203,163 | 4/1993 | Parsons | 60/39.07 |
| 5,269,133 | 12/1993 | Wallace | 60/39.83 |
| 5,363,641 | 11/1994 | Dixon et al. | 60/39.07 |
| 5,392,614 | 2/1995 | Coffinberry | 60/39.07 |

FOREIGN PATENT DOCUMENTS

| | | | |
|---|---|---|---|
| 0469825A2 | 2/1992 | European Pat. Off. | |
| 0469827A1 | 2/1992 | European Pat. Off. | |
| 2300390 | 7/1974 | Germany | 60/39.07 |
| 1244340 | 8/1971 | United Kingdom | 60/39.07 |

*Primary Examiner*—Timothy Thorpe
*Assistant Examiner*—Ted Kim
*Attorney, Agent, or Firm*—Watson Cole Stevens Davis, P.L.L.C.

[57] ABSTRACT

The present invention relates to a device for bleeding off and cooling hot air in an aircraft engine, including:

- at least one hot air take-off at the outlet of the compressors of the engine,
- a cold air take-off downstream of the fan of the engine,
- a precooling heat exchanger between said hot air and said cold air.

According to the invention, said precooling heat exchanger (18) comprises at least one (12A) of said linking arms (12) between the engine body (2) and the fan shroud (9), the said linking arm or arms (12A) acting as the exchanger, exhibiting a hollow structure traversed longitudinally by at least some of the hot air bled off at the outlet of the low pressure and/or high pressure stages of the compressors (3) of the engine.

13 Claims, 4 Drawing Sheets

DEVICE FOR BLEEDING OFF AND COOLING HOT AIR IN AN AIRCRAFT ENGINE

FIELD OF THE INVENTION

The present invention relates to a device for bleeding off and cooling hot air in an aircraft engine.

DESCRIPTION OF RELATED ART

In order to provide the air conditioning on board an aircraft, in particular, it is known to bleed off air from the compressors of the aircraft engines (turbojets especially, more particularly "bypass" turbojets). A certain quantity of hot and pressurized air is thus bled off at the outlet of the low pressure and/or high pressure compressors of the jet engine. Coming from these different sources, the air has to pass through various control members (valves controlled by thermostats, particularly) before being able to be mixed and metered, after which it is necessary to cool it a first time (precooling) before leading it to the user units: air conditioning unit, deicing system, etc.

Up to the present, in every case, the cooling air is bled off downstream of the fan of the engine before being directed to the precooling heat exchanger, which has the more or less pronounced drawback of impairing the performance of the engine. This is because the precooling heat exchanger (air/air) is, in a known way, generally installed in the pylon which supports the jet engine, linking the wings to the latter, in the region of the upper part of the pylon close to the leading edge of the wings. The hot pressurized air coming from the various stages of the engine is cooled by the air coming from the fan, which passes through the exchanger (to which it is lead by specific trunking) and is then ejected outward at the upper part of the pylon, in front of the leading edge of the wings.

This results in a significant air loss rate which no longer contributes to the thrust of the engine. Moreover, the fact of ejecting the cooling air outward, as indicated, causes turbulence, drag and aerodynamic disturbances.

SUMMARY OF THE INVENTION

The object of the present invention is to avoid these drawbacks, and it relates to a device for bleeding off and cooling hot air in an aircraft engine, arranged in such a way as to recover a maximum amount of the dynamic pressure, without causing aerodynamic disturbances.

To this end, the device for bleeding off and cooling hot air in an aircraft engine, said engine comprising:

- an engine body having compressors, combustion chambers and turbines,
- a fan arranged upstream of the engine body,
- a fairing including, from upstream downwards in the direction of flow of the air coming from the fan, an air intake, a fan shroud and outer and inner fairings of the airstream coming from the fan,
- linking arms between the engine body and the fan shroud, and
- an engine support pylon, linked, on the one hand, to the engine and, on the other hand, to the wings, said device being of the type including:

- at least one hot air take-off at the outlet of the low pressure and/or high pressure stages of the compressors of the engine,
- a cold air take-off downstream of the fan of the engine,
- a precooling heat exchanger between said hot air and said cold air, and
- air flow control valves, is noteworthy, according to the invention, in that said precooling heat exchanger comprises at least one of said linking arms between the engine body and the fan shroud, said linking arm or arms acting as the exchanger, exhibiting a hollow structure traversed longitudinally by at least some of the hot air bled off at the output of the low pressure and/or high pressure stages of the compressors of the engine.

Thus the device according to the invention, by virtue of its design as defined above, makes it possible, in particular, to recover the thrust by reinjecting the ventilation air from the exchanger (linking arm) into the air of the secondary flow of the engine (cold airstream), and to limit, if not dispense with, the significant encumbrance caused by the scoops, trunking, outlet grilles, which determine the dimensions of the pylon or of the engine casing.

Advantageously, said precooling heat exchanger includes a plurality of said linking arms, angularly distributed into several groups. In particular, four of said groups of arms may be provided, angularly spaced from one another by at least substantially 90°.

According to a first variant of the device according to the invention, each of said exchanger arms, in service, is traversed exclusively by the hot air, bled off at the output of the low pressure and/or high pressure stages of the compressors of the engine, flowing from the engine body towards the fan shroud.

According to a second variant of the device according to the invention, each of said exchanger arms, in service, is longitudinally traversed, against the current, by the hot air flowing from the engine body towards the fan shroud and by the cold air flow coming from the fan.

In this latter case, each of said arms advantageously has an internal partitioning within which, in service, said cold air flows.

More particularly, each arm may then exhibit a profiled cross section, corresponding substantially to the section of an "aircraft wing", said partitioning lying within this profile, exhibiting a substantially lozenge-shaped cross section, increasing the heat exchange surface area.

According to another characteristic of the invention, the device comprises a first trunking for bleeding off hot air from the low pressure and/or high pressure compressors of the engine, said trunking having a first tapping leading to said arms acting as the exchanger and a second tapping passing transversely through the engine and rejoining said first tapping so as to form a second trunking leading to the user facilities.

In particular, said first tapping may have various branches leading to the various groups of arms acting as the heat exchanger, various corresponding branches, at the exit from said arms, joining together in a duct linked to said second trunking.

According to yet another characteristic of the invention, a valve is provided in said first and/or in said second tapping, controlled by thermostats, which are arranged on said second trunking, in order to regulate the hot air flow coming from the compressors.

BRIEF DESCRIPTION OF THE DRAWINGS

The figures of the attached drawing will give a good understanding of how the invention can be produced. In these figures, identical references designate similar elements.

DETAILED DESCRIPTION OF THE PREFERRED EMBODIMENTS

Figure 1:
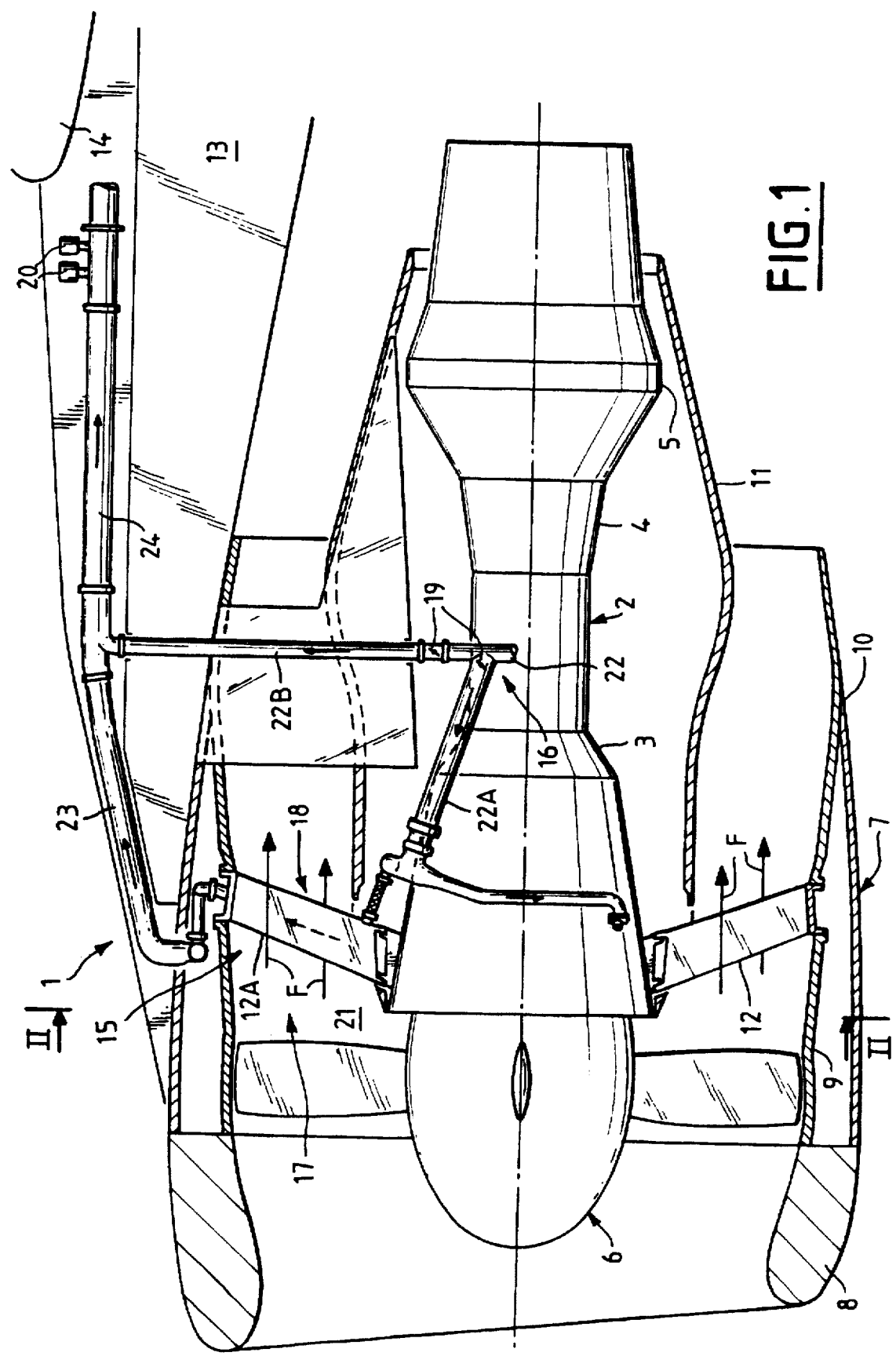
FIG. 1 is a diagrammatic view in longitudinal section of an aircraft engine, showing an example embodiment of the device according to the invention.

In the first place, it is appropriate to describe the general configuration of the aircraft engine 1 represented particularly in FIG. 1.

The "bypass" turbojet shown comprises:

- an engine body 2 having compressors 3, combustion chambers 4 and turbines 5,
- a fan 6 arranged upstream of the engine body 2 and linked thereto,
- a fairing 7 including, from upstream downwards in the direction of flow of the air coming from the fan 6, an air intake 8, a fan shroud proper 9 and outer 10 and inner 11 fairings of the cold airstream.
- linking arms 12 between the engine body 2 and the fan shroud 9, and
- a pylon 13 for support of the engine 1, linked, on the one hand, to the engine, and on the other hand, to the wings 14.

It will be noted that the inner fairing 11 of the secondary flow (cold airstream) contains, in addition to the engine body 2, auxiliary elements, such as pumps, alternators, regulators, particularly, which are cooled by an air flow which runs through this compartment from upstream downwards.

Figure 3:
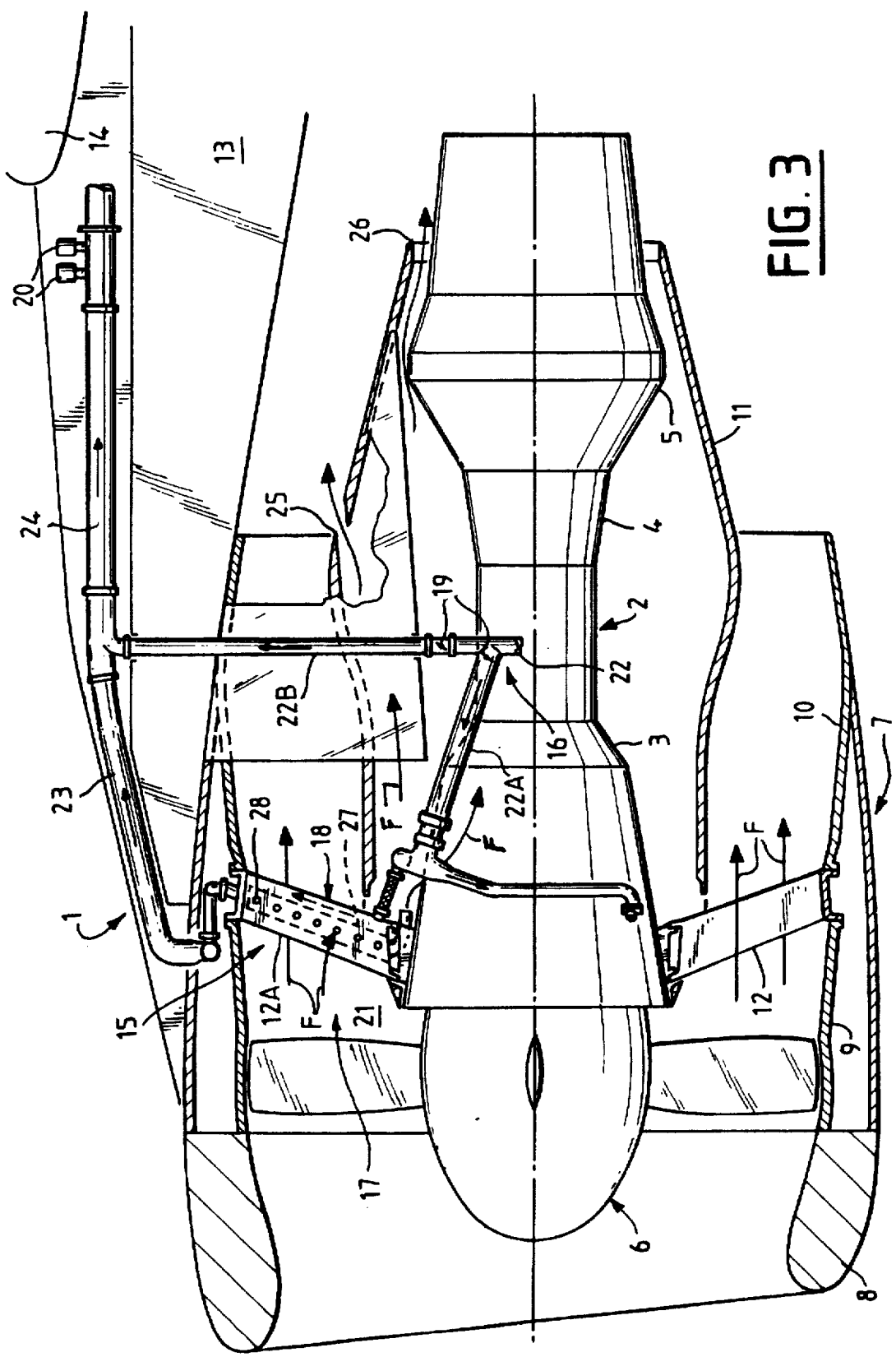
FIG. 3 is a view similar to FIG. 1, showing a variant of the device of the invention.

Moreover, the device 15 for bleeding off and cooling hot air in the engine 1 of the aircraft includes:

- a hot air take-off 16 at the outlet of the low pressure and/or high pressure stages of the compressors 3 of the engine,
- a cold air take-off 17 downstream of the fan 6 of the engine,
- a precooling heat exchanger 18 between the hot air and the cold air, and
- air flow control valves 19 controlled, for example, by thermostats 20, which, as shown in FIGS. 1 and 3, can be disposed on second trunking 24.

More particularly, according to the invention, the precooling heat exchanger 18 comprises some (12A) of the linking arms 12 between the engine body 2 and the fan shroud 9, said linking arms 12A, acting as the exchanger, exhibiting a hollow structure traversed longitudinally (arrow in broken lines in FIG. 1) by at least some of the hot air bled off at the outlet of the low pressure and/or high pressure stages of the compressors 3 of the engine 2 (hot air take-off 16).

Figure 2:
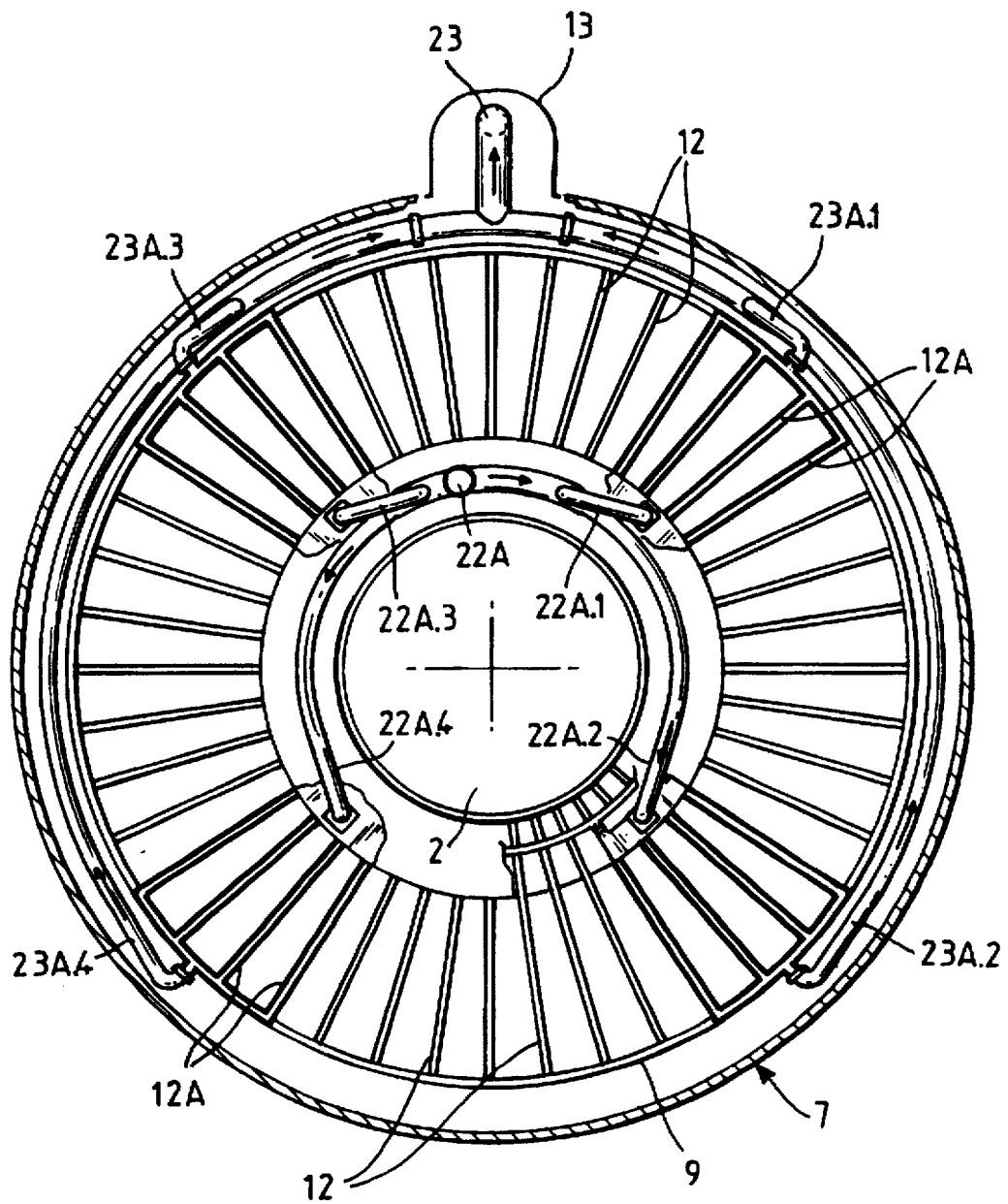
FIG. 2 is a cross section along the line II—II of FIG. 1.

As can be seen in FIG. 2, the arms 12A are advantageously, distributed into four groups, angularly spaced, from one another by 90°, this distribution providing a better heat exchange between the hot air flowing in each of said arms 12A from the engine body 2 to the fan shroud 9, and the cold airstream 21 coming from the fan 6. By way of example, each group of arms 12A may comprise four arms, as shown in FIG. 2.

Moreover, the arms 12A retain their structural role of mechanical link between the fan shroud 9 and the engine body 2, as well as, clearly, the remaining arms 12.

As can also be seen in FIG. 1, a first trunking 22 is provided for bleeding off hot air from the low pressure and/or high pressure compressors of the engine, said trunking 22 having a first tapping 22A, various branches 22A.1, 22A.2, 22A.3, 22A.4 of which (FIG. 2) lead to the various groups of arms 12A acting as the heat exchanger. At the exit from said arms, various corresponding branches 23A.1, 23A.2, 23A.3, 23A.4 (FIG. 2) join together in a duct 23 extending into the pylon 13 towards the wings 14. A second tapping 22B of the trunking 22, passing transversely through the engine 1, rejoins this duct 23 so as to form a second trunking 24, equipped with thermostats 20, leading to the user facilities (not represented). In addition, a valve 19 can be provided in the tapping 22A and/or the tapping 22B, controlled by thermostats 20, making it possible to regulate the hot air flow coming from the compressors, while the cold air ventilation (arrows F) remains continuous.

In a first variant of the device according to the invention, illustrated particularly in FIG. 1, each hollow arm 12A, in service, is traversed exclusively by the hot air, bled off at the outlet of the low pressure and/or high pressure stages of the compressors of the engine, flowing from the engine body 2 towards the fan shroud 9. As can be seen in FIG. 1 (arrows F), the ventilation air then simply passes between the arms 12A acting as the heat exchanger and emerges, "naturally", between the outer 10 and inner 11 fairings of the cold airstream.

Figure 4:
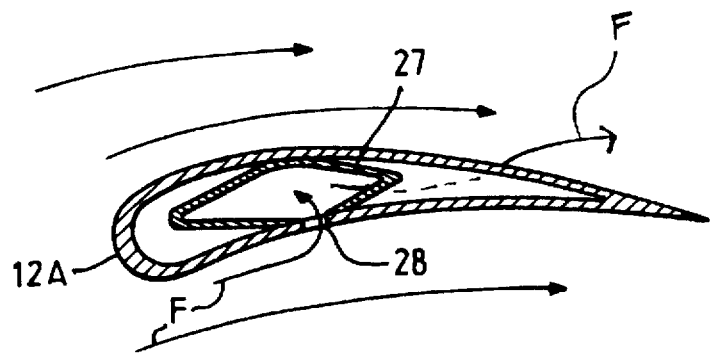
FIG. 4 is a cross section of a linking arm, acting as the heat exchanger, of the variant of FIG. 3.

In contrast, according to a second variant of the device of the invention, illustrated by FIGS. 3 and 4, each hollow arm 12A, in service, is traversed longitudinally, against the current, by the hot air flow flowing from the engine body 2 towards the fan shroud 9 and by the cold air flow coming from the fan 6. The ventilation air thus passing through the arms 12A emerges from the inner fairing 11 through the outlets 25 and 26 provided, respectively, in the region of the combustion chambers 4 and of the turbines 5, so as to rejoin the cold airstream.

In this latter case, each arm 12A may, as represented, exhibit an internal partitioning 27, linked to the outside of the arm 12A by holes 28, within which, in service, the cold air flows (FIG. 4). In this FIG. 4 it can also be seen that the arm 12A exhibiting a profiled cross section corresponding substantially to the section of an "aircraft wing", the partitioning 27 lies within this profile, exhibiting a substantially lozenge-shaped cross section, increasing the heat exchange surface area. Clearly, the hot air, in the arm 12A, flows outside the partitioning 27. Other configurations would certainly be possible, particularly a configuration reversed with respect to that previously described relating to the flow ("outer" or "inner") of the cold air and hot air flows.

It will be noted moreover that the general configuration of the variant of FIGS. 3 and 4 does not otherwise differ from the configuration described with regard to FIGS. 1 and 2.

Moreover, the arms 12A, or groups of arms, are preferably fixed isostatically with the outer shroud as reference point. The linking of an arm 12A between the engine body 2 and the fan shroud 9 is illustrated in FIG. 5, this link having to take account of the thermal stresses to which the arm 12A is subjected in service (expansions particularly).

Figure 5:
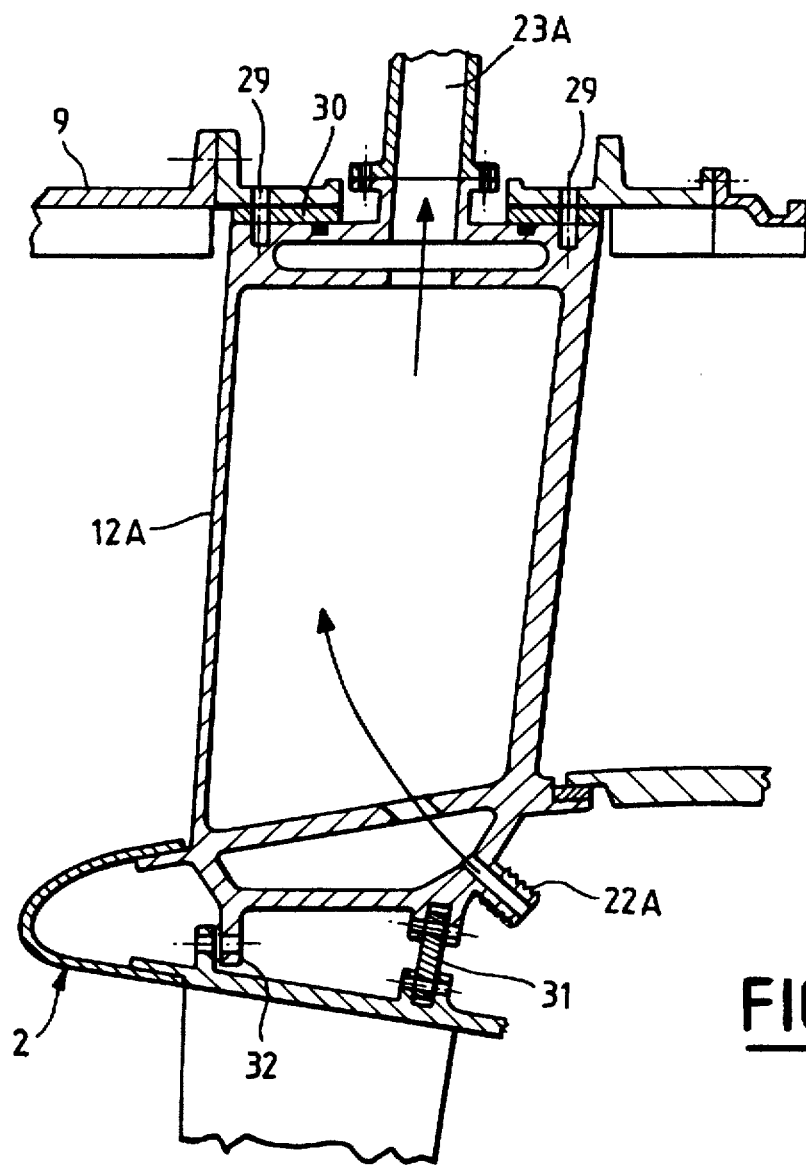
FIG. 5 shows the link of an exchanger arm according to the invention between the engine body and the fan shroud.

Hence, as can be seen in FIG. 5, the arm 12A, produced in accordance with one or other of the previously described variants, exhibits, on the one hand, in the region of its means of fixing 29 to the fan shroud 9, thermal and anti-friction insulation 30, and, on the other hand, in the region of its fixing to the engine body 2, a link rod 31 on one side and, on the other, fixing means 32 combined with an anti-friction washer and with clearance for the thermal expansion.

Moreover, with the arms 12A being fixed within the fan shroud, this procures the following advantages:

the continuous fan shroud is pierced only to remove the air towards the trunking 24 or to fix the arms 12, 12A;

any leakage of secondary air to the outside is limited as far as possible;

the reference of the exchanger arm or arms 12A is supplied by "cold parts".

I claim:

1. A device for bleeding off and cooling hot air in an engine of an aircraft, the aircraft having a body, said engine comprising:

an engine body having a compressor, a combustion chamber and a turbine, the engine defining an upstream direction and a downstream direction;

a fan, arranged in the upstream direction from the engine body, for causing a flow of air in the downstream direction;

a fairing assembly comprising an air intake, a fan shroud and outer and inner fairings;

a plurality of linking arms for connecting the engine body with the fan shroud; and engine support means for connecting the engine to the body of the aircraft;

said device comprising:

hot air take-off means, in communication with the engine, for taking off hot air from the engine, a cold air take-off means, disposed downstream of the fan of the engine, for taking off cold air from the flow of air coming from the fan; and a precooling heat exchanger for causing a heat exchange between said hot air taken off by the hot air take-off means and said cold air taken off by the cold air take-off means, the precooling heat exchanger comprising at least one of the plurality of linking arms, said at least one of the plurality of linking arms having (i) a hollow structure traversed longitudinally in a first direction by at least a portion of the hot air and an internal partitioned portion in which the cold air flows in a second direction which is opposite to the first direction.

2. The device as claimed in claim 1, wherein said at least one linking arm of the precooling heat exchanger comprises a subplurality of the plurality of linking arms, the subplurality being angularly distributed around a periphery of the engine body into several groups.

3. The device as claimed in claim 2, comprising four of said groups of linking arms angularly spaced from one another around the periphery of the engine body by at least substantially 90°.

4. The device as claimed in claim 1, wherein said at least one linking arm has a profiled cross section having substantially a same shape as a cross section of an aircraft wing, said internal partitioned portion lying within the profiled cross section and having a substantially lozenge-shaped cross section so as to increase heat exchange surface area for the heat exchange.

5. The device as claimed in claim 1, wherein the hot air take-off means comprises;

first trunking for bleeding off the hot air from the engine;

a first tapping leading from the first trunking to said at least one linking arm; and a second tapping leading from the first trunking, passing transversely through the engine and rejoining said first tapping so as to form a second trunking leading to the body of the aircraft.

6. The device as claimed in claim 5, wherein:

the at least one linking arm comprises a plurality of groups of linking arms; and said first tapping comprises (i) a first plurality of branches, each leading from the first trunking to a linking arm in the plurality of groups and (ii) a second plurality of branches, each leading from a linking arm in the plurality of groups, joining together in a duct linked to said second trunking.

7. The device as claimed in claim 5, further comprising:

a valve provided in at least one of said first tapping and said second tapping; and thermostat means, arranged on said second trunking, for controlling the valve in order to regulate a flow of the hot air from the engine.

8. The device as claimed in claim 5, further comprising air flow regulating means, disposed in a path of the hot air between the hot air pick-off means and the precooling heat exchanger, for regulating a flow of the hot air into the precooling heat exchanger.

9. The device as claimed in claim 8, wherein the air flow regulating means comprises:

a first air flow regulating valve in the first tapping; and a second air flow regulating valve in the second tapping.

10. The device as claimed in claim 1, further comprising air flow regulating means, disposed in a path of the hot air between the hot air pick-off means and the precooling heat exchanger, for regulating a flow of the hot air into the precooling heat exchanger.

11. The device as claimed in claim 10, wherein the air flow regulating means comprises at least one air flow regulating valve disposed in the path of the hot air.

12. The device as claimed in claim 1, wherein the precooling heat exchanger has a plurality of holes for allowing the cold air to enter the internal partitioned portion and an exhaust for allowing the cold air to exit the internal partitioned portion.

13. A device for bleeding off and cooling hot air in an engine of an aircraft, the aircraft having a body, said engine comprising:

an engine body having a compressor, a combustion chamber and a turbine, the engine defining an upstream direction and a downstream direction;

a fan, arranged in the upstream direction from the engine body, for causing a flow of air in the downstream direction;

a fairing assembly comprising an air intake, a fan shroud and outer and inner fairings;

a plurality of linking arms for connecting the engine body with the fan shroud; and engine support means for connecting the engine to the body of the aircraft; said device comprising:

hot air take-off means, in communication with the engine, for taking off hot air from the engine, a cold air take-off means, disposed downstream of the fan of the engine, for taking off cold air from the flow of air coming from the fan; and a precooling heat exchanger for causing a heat exchange between said hot air taken off by the hot air take-off means and said cold air taken off by the cold air take-off means, the precooling heat exchanger comprising a plurality of groups of linking arms within the plurality of linking arms, each of said plurality of groups of linking arms having a hollow structure traversed longitudinally by at least a portion of the hot air;

wherein the hot air take-off means comprises:
- a first trunking for bleeding off the hot air from the engine;
- a first tapping leading from the first trunking to said plurality of groups of linking arms, said first tapping comprising (i) a first plurality of branches, each leading from the first trunking to a linking arm in the plurality of groups, and (ii) a second plurality of branches, each leading from a linking arm in the plurality of groups, joining together in a duct; and
- a second tapping leading from the first trunking, passing transversely through the engine and rejoining said duct so as to form a second trunking leading to the body of the aircraft.

* * * * *